(12) United States Patent
Matsubara et al.

(10) Patent No.: US 7,271,516 B2
(45) Date of Patent: Sep. 18, 2007

(54) STEPPING MOTOR FOR GENERATING VIBRATION

(75) Inventors: Masaaki Matsubara, Yonago (JP); Kazuaki Sato, Yonago (JP); Osamu Furuta, Yonago (JP); Mikio Umehara, Yonago (JP); Toshiaki Tsuzaki, Yonago (JP); Chee Poh Chua, Yonago (JP)

(73) Assignee: Minebea-Matsushita Motor, Tokyo (JP)

( * ) Notice: Subject to any disclaimer, the term of this patent is extended or adjusted under 35 U.S.C. 154(b) by 0 days.

(21) Appl. No.: 11/412,999

(22) Filed: Apr. 28, 2006

(65) Prior Publication Data

US 2006/0267427 A1    Nov. 30, 2006

(30) Foreign Application Priority Data

May 27, 2005    (JP) ............... 2005-156425

(51) Int. Cl.
H02K 7/06    (2006.01)
(52) U.S. Cl. ........................................ 310/81
(58) Field of Classification Search ................ 310/81, 310/49 R, 156.13, 156.44
See application file for complete search history.

(56) References Cited

U.S. PATENT DOCUMENTS

| | | | |
|---|---|---|---|
| 4,737,674 A * | 4/1988 | Miyao ......................... | 310/268 |
| 4,891,537 A * | 1/1990 | Shiraki et al. ............. | 310/68 B |
| 5,679,997 A | 10/1997 | Matsuzawa et al. | |
| 6,208,238 B1 | 3/2001 | Ohta | |
| 6,326,711 B1 * | 12/2001 | Yamaguchi et al. .......... | 310/81 |
| 6,342,742 B1 | 1/2002 | Kim | |
| 6,636,007 B2 | 10/2003 | Hong et al. | |
| 6,711,269 B2 | 3/2004 | Kobayashi et al. | |
| 6,759,786 B2 * | 7/2004 | Horng et al. ................ | 310/257 |
| 6,996,228 B1 | 2/2006 | Niemitalo | |
| 2004/0104631 A1 | 6/2004 | Noguchi | |

FOREIGN PATENT DOCUMENTS

| | | |
|---|---|---|
| DE | 44 27 337 A1 | 2/1994 |
| EP | 1 003 317 A2 | 5/2000 |
| EP | 1 035 633 A1 | 9/2000 |
| EP | 1 115 192 A2 | 7/2001 |
| EP | 1 241 771 A1 | 9/2002 |
| EP | 1 241 918 A2 | 9/2002 |
| JP | 9-93862 | 4/1997 |
| JP | 2000-262969 | 9/2000 |
| JP | 2004-320941 | 11/2004 |

* cited by examiner

*Primary Examiner*—Dang Le
*Assistant Examiner*—Nguyen Hanh
(74) *Attorney, Agent, or Firm*—Foley and Lardner LLP

(57) ABSTRACT

A stepping motor for generating vibration is provided and includes a stator and a rotor. The rotor includes a shaft, a ring magnet and a rotor frame, and the rotor frame is formed into a substantial cup-shape including a disk portion having an opening at the center and also including a cylindrical portion continuously arranged at the periphery of the disk portion, and a weight portion is arranged in a portion of the rotor frame so that the gravity center of the rotor frame an be located at a position eccentric with respect to the center of the rotor frame.

10 Claims, 9 Drawing Sheets

FIG. 6B
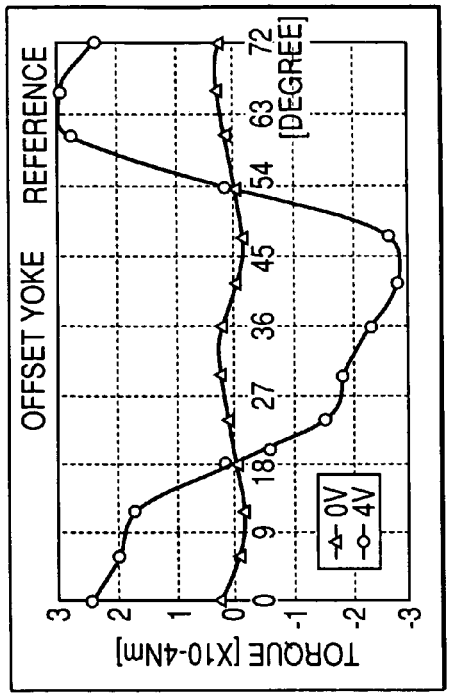
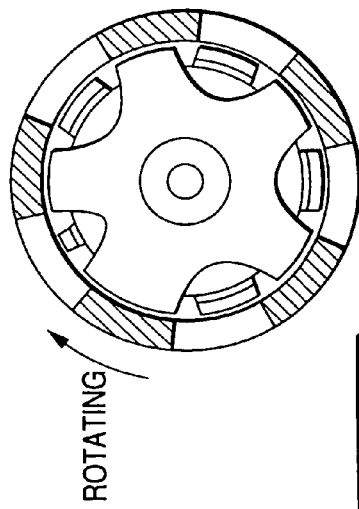
OFFSET YOKE
FIG. 6A
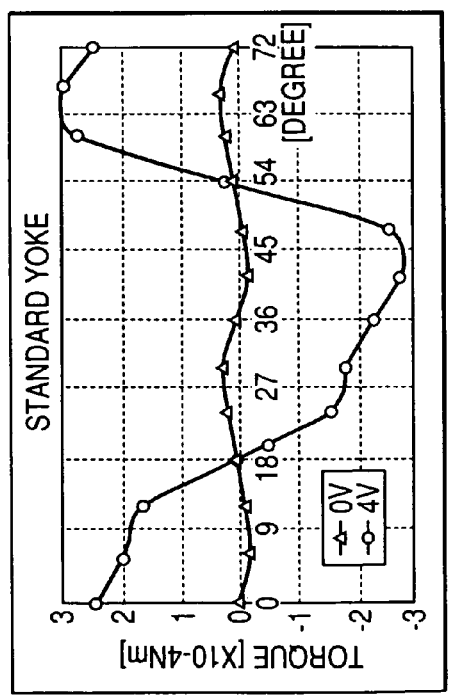
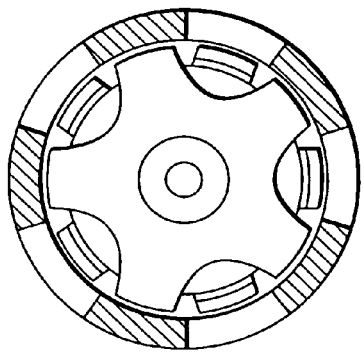
STANDARD YOKE

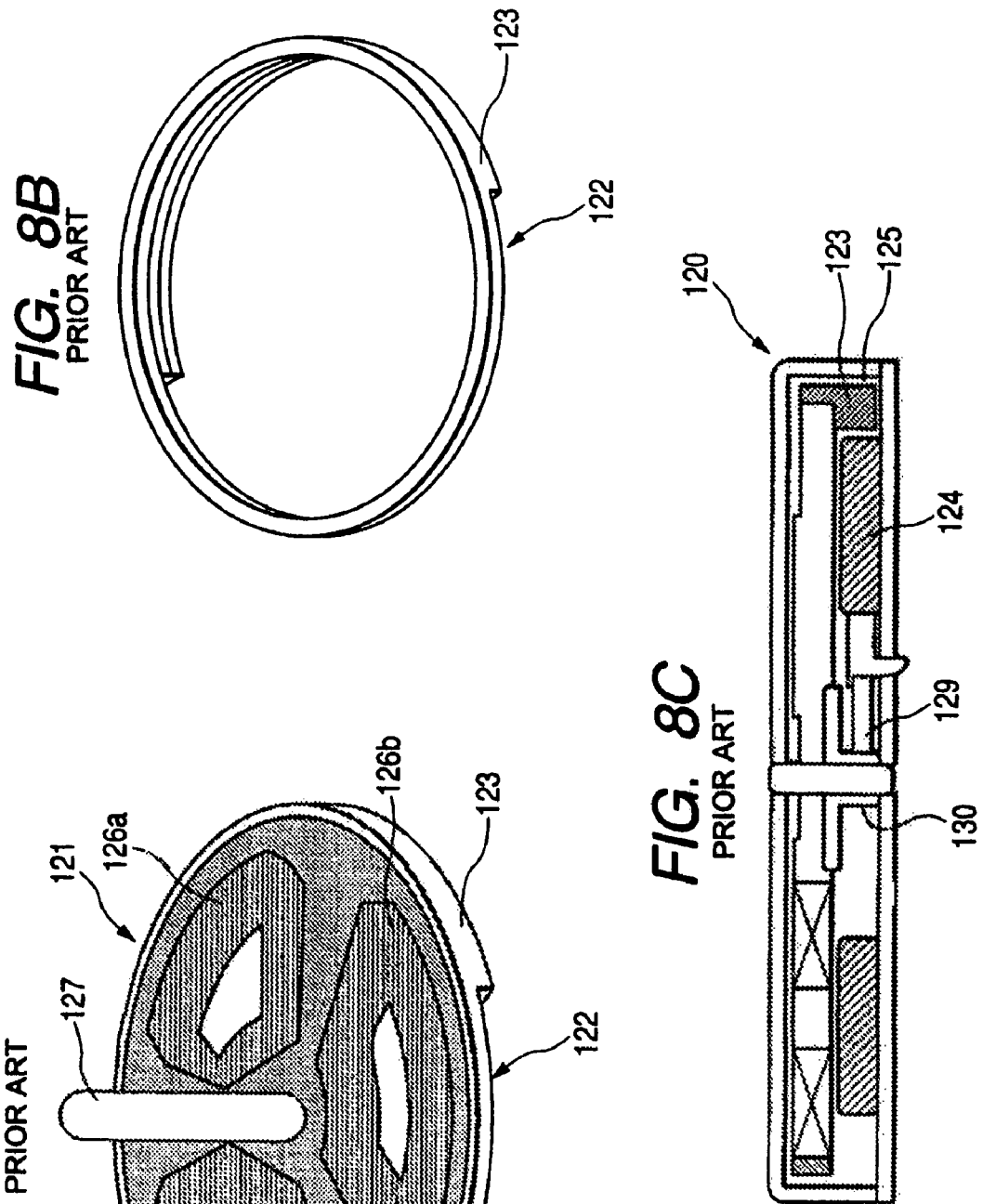
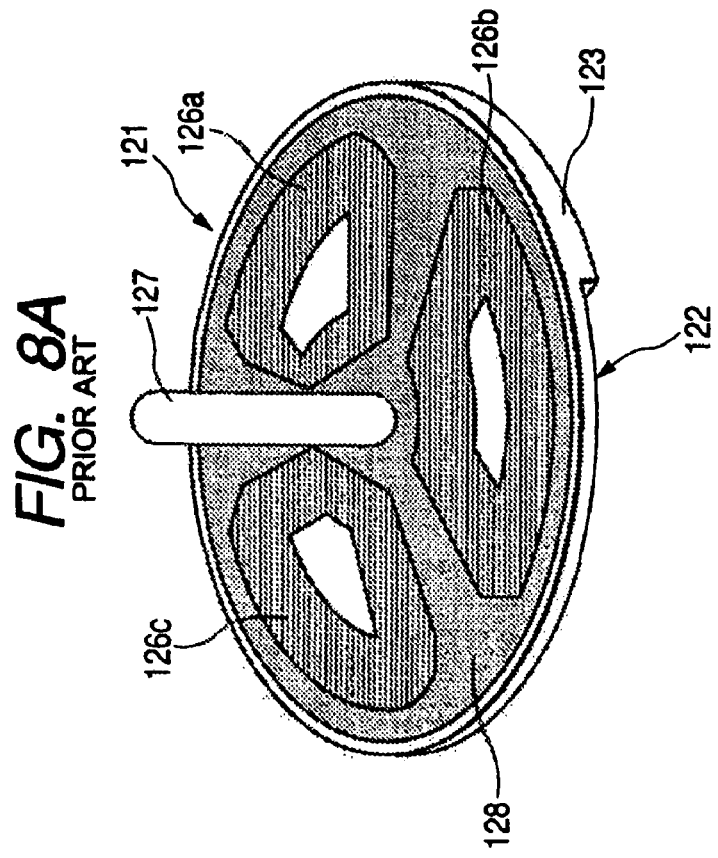

STEPPING MOTOR FOR GENERATING VIBRATION

FIELD OF THE INVENTION

The invention relates to a stepping motor for generating vibration mainly used as an informing means for a call-reception.

BACKGROUND OF THE INVENTION

According to the eccentric mechanism in the related art, (a) an eccentric disk is attached to an output shaft or (b) a portion of three armature coils, which are equally arranged, is deleted. However, in the case of item (a), it is difficult to reduce the thickness of the device. Further, there is a possibility that the eccentric disk is disconnected by a vibration and centrifugal force generated at the time of rotation. In the case of item (b), an opposing area between the magnetic flux, which is generated by the magnetic field magnet, and the coil of the armature is substantially decreased. Therefore, a ratio of the input to the output of the motor is deteriorated. From the above reasons, it is required to develop another eccentric mechanism.

On the other hand, concerning the motor to be used, investigations are made into not only a DC brush motor but also other various types of motors.

Life of a brushless motor is long, that is, reliability of a brushless motor is high because the brushless motor has no brushes. It is possible to adjust a vibration of the brushless motor by controlling its rotating speed with frequency. Therefore, the structure can be made simple.

Especially, in the case of a cellular phone, since it is necessary to incorporate various functions into the cellular phone, the number of elements mounted on the integrated circuit and the capacity of the memory are exponentially increased. Therefore, it is easy to incorporate a simple circuit into the cellular phone.

FIGS. 7A to 7C are arrangement views showing a flat type vibration motor in the related art. Concerning this vibration motor, for example, refer to JP-A-2000-262969. FIG. 7A is a plan view of the rotor, FIG. 7B is a sectional view of the rotor and FIG. 7C is a sectional view of the vibration motor.

In a vibration motor 101 shown in FIGS. 7A to 7C, a bearing device 103 is engaged in the central opening of a printed circuit board 102. A stator core 104 is engaged with and fixed to this bearing device 103.

A cover 105 is formed into a substantial cup-shape and its peripheral portion is engaged with the periphery of the printed circuit board 102.

A stator 106 includes a stator core 104 and a coil 107 wound around the stator core 104.

A rotor 110 includes: a magnet 109; a magnetic path yoke 111; and an imbalance weight 108. The imbalance weight 108 is attached inside the cup-shaped rotor 110 above the magnet 109. The magnet 109 is arranged on the outer circumference of the stator core 104 being opposed to each other while leaving a gap between the magnet 109 and the stator core 104. In the magnetic path yoke 111, an inside ring portion 112 and an outside ring portion 115, in which an annular plate portion 113 and an cylindrical portion 114 are continuously provided, are connected with each other by three spoke portions 116. On the inside of the magnetic path yoke 111 on the side to which the cylindrical portion 114 is connected, the arcuate imbalance weight 108 is provided. On the opening side of the cylindrical portion 114, the annular magnet 109, which prevents the imbalance weight 108 from coming out, is provided.

The imbalance weight 108 is arranged in an upper portion in the axial direction of the magnet 109. According to this structure, the imbalance weight 108 is accommodated in an empty space of the circumference opposed type motor having a core. Therefore, the volume of the entire vibration motor can be reduced. Accordingly, it is possible to obtain a small light motor. Further, since the imbalance weight 108 is housed inside the rotor 110, there is no possibility that the imbalance weight is disconnected. Therefore, it is possible to provide a highly reliable motor. Since it is possible to increase diameters of the magnet 109 and the stator core 104, a motor output per unit mass can be increased. In other words, the weight of the vibration motor can be further reduced.

The vibration motor shown in FIGS. 7A to 7C is preferable because the imbalance weight 108 is not disconnected since the imbalance weight 108 is housed inside the rotor 110. However, the following problems may be encountered.

(1) Since the imbalance weight 108 is housed inside the rotor 110, it is necessary to manufacture both the imbalance weight 108 and the rotor 110 at high dimensional accuracy. Therefore, the number of the manufacturing processes is increased.

(2) It is necessary to attach the imbalance weight 108 at an appropriate position so that an unnecessary vibration can not be generated at the time of rotating the rotor and so that the attaching portion can not be damaged and the imbalance weight 108 can not be freely moved, that is, high dimensional accuracy is required for assembling the vibration motor.

(3) Since the imbalance weight 108 is partially located only on the upper side of the shaft 117, vibration is also generated in the axial direction, and it is impossible to effectively pick up vibration in the radial direction, that is, the efficiency is low.

(4) Since the imbalance weight 108 is formed into a body different from the rotor 110, it is necessary to provide a special process in which the imbalance weight 108 is incorporated into the rotor 110.

(5) On the upper face side of the rotor 110, the inside ring portion 112 and the annular plate portion 113 of the outside ring portion 115 are connected to each other by three spoke portions 116. Therefore, opening portions 118 are formed. Due to these opening portions 118, when the imbalance weight 108 is attached to the rotor 110, the attaching area is decreased. As a result, the supporting strength is lowered.

It can be considered that the above problems are originated from the fact that the imbalance weight 108 is formed into a body different from the rotor 110. Therefore, from the viewpoint of integrating the imbalance weight 108 with the rotor 110 into one body, the related art is surveyed as follows. For example, the vibration motor shown in FIGS. 8A to 8C is provided.

FIGS. 8A to 8C are arrangement views of a flat coreless vibration motor in the related art. For example, this vibration motor is shown in JP-A-09-093862. FIG. 8A is a perspective view of the rotor in which an eccentric ring is arranged, FIG. 8B is a perspective view of the eccentric ring and FIG. 8C is a sectional view of the flat coreless vibration motor.

In a flat coreless vibration motor 120 shown in FIGS. 8A to 8C, a ring 122 is arranged on the outer circumference of a rotor 121. A deformed portion 123, the gravity center of which is eccentric, is formed in a portion of the ring 122. A protruding portion, which protrudes to an outer circumferential space 125 of a field magnet 124, is formed.

In this example, only the ring 122 having the deformed portion 123, which forms an eccentric gravity center, is engaged with the outer circumference of the rotor 121. Therefore, it is unnecessary to conduct machining for the eccentric gravity center on the rotor 121 itself Accordingly, this structure is advantageous in that the manufacturing cost is reduced.

However, even in this example in which the deformed portion 123 is formed integrally with the rotor 121, the following problems may be encountered.

(1) Since the deformed portion 123 is formed in the ring 122, the outer circumferential shape of which is the same as that of the rotor 121, it is easy to manufacture the ring 122 and the deformed portion 123. However, an objective portion of the rotor 121, to which the ring 122 is attached, that is, a portion 128, in which three coils 126a, 126b, 126c including a shaft 127 are integrally formed by means of molding of engineering plastics, must be formed into a body different from the ring 122 made of metal. Therefore, the number of processes of forming those components into the rotor 121 is increased.

(2) Since the deformed portion 123 is formed in the ring 122, the outer circumferential shape of which is suited to that of the rotor 121, it is easy to manufacture the ring 122 and the deformed portion 123. However, an objective portion of the rotor 121, to which the ring 122 is attached, that is, a portion 128, in which three coils 126a, 126b, 126c including the shaft 127 are integrally formed by means of molding of engineering plastics, has an expansion coefficient different from that of the ring 122 made of metal. Accordingly, there is a possibility that a portion 128 concerned and the ring 122 are separated from each other and vibration is generated. Since the different materials are used, there is a possibility of the poor mechanical strength.

(3) The outer circumferential space 125 must be formed on the outer circumferential side of the magnetic field magnet 124. Therefore, the shape of the magnetic field magnet 124 is restricted and the obtained magnetic force is restricted.

(4) Since the rotor 121 is of the axial direction opposed type in this example, the coils 126a, 126, 126c are arranged in the rotor 121. Therefore, when the ring 122 is provided in the rotor 121, the coils 126a, 126b, 126c as well as the ring 122 must be provided in the rotor 121. As a result, since the coils 126a, 126b, 126c are provided in the rotor 121, it is impossible to form the rotor 121 out of the same material as that of the ring 122.

(5) In this example, the vibration motor is provided with a brush 129 and a commutator 130, the brush 129 may be damaged and contaminated. Further, at the time of starting and stopping, the rotating speed is changed and it is impossible to maintain the rotating speed constant.

Although the above problems are encountered, DC motor having a brush has been used for generating vibration of a cellular phone until now.

The reason why is described as follows. Since the semiconductor integration technique was in retard, it was difficult to specially manufacture a circuit containing a motor control circuit in a small cellular phone. Therefore, DC motor having no brushes, the price of which is low, in which trouble seldom occurs, has been mainly used.

Concerning the coin type, the thickness can be reduced, however, the life is short and it is difficult to control it because the starting and the stopping time are long.

In order to solve the above problems, it can be considered to use a stepping motor, the control circuit structure of which is simple and the rotating speed control of which is easy at the time of starting and stopping, as a vibration motor. However, the stepping motor is used as a vibration motor only for a special use.

FIGS. 9A to 9C are arrangement view showing a vibration motor in which a stepping motor in the related art is used. Concerning this vibration motor, for example, refer to JP-A-2004-320941. FIG. 9A is a plan view showing a main portion, wherein this view is taken when the resin base side is seen from the permanent magnet side. FIG. 9B is a perspective view of the rotor yoke. FIG. 9C is a sectional view.

A stepping motor 140 shown in FIGS. 9A to 9C includes: a stator 145 in which a flat coreless coil 144 is provided on a resin base 141 via a stator yoke 142 and a circuit board 143; and a rotor 150 having a permanent magnet 149, which is arranged on a rotor yoke 148 having a rotary shaft 147 pivotally supported by the stator 145 via a bearing 146, wherein this permanent magnet 149 is arranged while leaving a predetermined gap with respect to the coreless coil 144 in the axial gap system.

The ring-shaped stator yoke 142 made of magnetic material and the flexible ring-shaped circuit board 143, which is a wiring portion, are fixed to the disk-shaped resin base 141 made of resin material by means of molding. This circuit board 143 is made of insulating material, and the four flat coreless coils 144, the shapes of which are respectively formed into a sector-shape when they are seen in a plan view, are arranged on the circuit board 143 round the rotary center L of the rotor 150 described later at regular intervals of 90°.

The rotor yoke 148, which is a magnetic thin sheet, is made of magnetic material and formed into a disk-shape by means of molding. On this rotor yoke 148, the annular permanent magnet 149 is mechanically fixed. Six poles of the permanent magnet 149 are arranged around the rotation center L at regular intervals of 60° so that N-pole and S-pole can be alternately located to be different magnetic poles from each other.

When a weight member 151 is fixed at a position of the rotor yoke 148 which is eccentric with respect to the rotation center L of the rotor 150 and this rotor 150 is rotated, the vibration motor can be applied to a cellular phone or a toy.

The following problems may be encountered in the vibration motor using the above stepping motor.

(1) The rotor yoke 148 of the rotor 150 and the weight member 151 must be respectively formed into different bodies and combined with each other. Therefore, high dimensional accuracy is required for the rotor yoke 148 and the weight member 151. Further, it is necessary to provide an assembling process of assembling the bodies which are formed differently from each other.

(2) It is necessary to precisely detect the eccentric position of the rotor yoke 148. It is also necessary to strongly fix the weight member 151 at the eccentric position. Therefore, the positioning work is required and further the manufacturing process is increased.

(3) Since the coreless coil 144 is used, the coil size can not be reduced and the number of the magnetic poles can not be increased. Accordingly, the number of steps can not be increased. Since the coreless structure is adopted, permeance of the magnetic circuit is low and a quantity of the permanent magnet to be used is increased.

(4) Since the magnetic circuit composed of the permanent magnet 149 and the coreless coil 144 is of the axial direction opposed type, an intensity of the magnetic force for rotation is lower than that of the radial direction opposed type. Therefore, it is difficult to pick up the vibration strongly and effectively. Since the weight member 151 is arranged outside the rotor yoke 148 and the size of the weight member 151 is small, it is impossible to pick up the vibration strongly and effectively.

SUMMARY OF THE INVENTION

An object of an illustrative, non-limiting embodiment of the invention is to overcome the above problems, and to provide a stepping motor for generating vibration, which can be simply controlled and can generate a strong vibration and effectively generate a driving torque. Also, the invention is not always required to overcome the problems described above, and an illustrative, non-limiting embodiment of the invention may overcome different disadvantageous.

In an exemplary embodiment of the invention:

(a) a stepping motor for generating vibration includes a weight portion which is arranged in a portion of a rotor frame; and (b) a magnet includes a ring magnet or a ring magnet and an outside auxiliary pole magnet, and the starting position of the rotor may be adjusted in such a manner that a length in the rotation direction of each magnetic pole NS (a length of a magnetic pole in the rotation direction) of at least one pair of magnetic poles in a plurality of magnetic poles in the ring magnet is made to be different from a uniform length in the rotation direction of the magnetic pole of the other pair of magnetic poles or alternatively a position of the outside auxiliary pole magnet is adjusted; or (c) the starting position may be adjusted in such a manner that a length in the rotation direction of the pole teeth, which are arranged in a comb-like arrangement, of a pair of stator yokes is partially made to be not uniform. For example, when the number of the pole teeth of one stator yoke is 5, the pole tooth pitch between a pair of the stator yokes is usually 36°. Therefore, in order to make the width of the pole tooth partially not uniform, the pitch (interval) between the pole teeth, which are adjacent to each other, is shifted to "36°+9°+α°" (α° is an arbitrary angle). Between the shifted pair of the pole teeth, a length in the rotation direction of one pole tooth is extended and a length in the rotation direction of the other pole tooth is shortened. The number of the pole teeth, which are made to be not uniform, can be arbitrarily selected.

In an outer rotor type stepping motor for generating vibration of the invention:

(a-1) a weight portion, which functions as a back yoke of the magnet, is integrally provided in a portion of the rotor frame; and (b-1) the magnet may include a ring magnet or a ring magnet and an outside auxiliary pole magnet, and the starting position may be adjusted in such a manner that a length in the rotation direction of each magnetic pole NS (a length of a magnetic pole in the rotation direction) of at least one pair of magnetic poles in a plurality of magnetic poles in the ring magnet is made to be different from a uniform length in the rotation direction of the magnetic pole of the other pair of magnetic poles or alternatively a position of the outside auxiliary pole magnet is adjusted; or (c-1) the starting position may be adjusted in such a manner that a length in the rotation direction of the pole teeth, which are arranged in a comb-like arrangement, in a pair of stator yokes is partially made to be not uniform.

Specifically, in an outer rotor type stepping motor for generating vibration of the invention, a rotor including a ring magnet is provided outside a stator; the rotor includes a shaft, a magnet including the ring magnet and a rotor frame; the rotor frame is formed into a substantial cup-shape including a disk portion having an opening at the center and a cylindrical portion continuously provided at the periphery of the disk portion; a weight portion is provided in a portion of the rotor frame so that the gravity center of the rotor frame can be eccentric to the center of the rotor frame; a ring magnet, in which a plurality of pairs of magnetic poles each having N-pole and S-pole are annularly arranged, is provided inside the rotor frame including the weight portion; a stator includes an annular stator coil and stator yokes for holding the stator coil from both sides in a state in which the pole teeth are meshed in a comb-like arrangement; and the magnet of the rotor is opposed to the outside surface of the pole teeth in the radial direction.

(A-1) In an outer rotor type stepping motor for generating vibration of the invention, in order to set the starting position at an appropriate position, a length in the rotation direction of each NS magnetic pole (a length of a magnetic pole in the rotation direction) of at least a pair of magnetic poles in a plurality of pairs of the magnetic poles in the ring magnet may be made to be different from a uniform length in the rotation direction of the respective magnetic poles of the other pair of the magnetic poles so as to conduct an adjustment.

(B-1) Alternatively, in an outer rotor type stepping motor for generating vibration of the invention, in order to set the starting position at an appropriate position, a position of the outside auxiliary pole magnet used in combination with the ring magnet may be adjusted.

(C-1) Alternatively, in an outer rotor type stepping motor for generating vibration of the invention, in order to set the starting position at an appropriate position, lengths in the rotation direction of the pole teeth in the pair of stator yokes, which are arranged in a comb-like arrangement, may be adjusted so that it can not be partially uniform.

In an inner rotor type stepping motor for generating vibration of the invention:

(a-2) the weight portion is integrally provided in a portion of the rotor frame; and (b-2) the magnet may include a ring magnet, and the starting position may be adjusted in such a manner that a length in the rotation direction of each magnetic pole NS (a length of a magnetic pole in the rotation direction) of at least one pair of magnetic poles in a plurality of magnetic poles in the ring magnet is made to be different from a uniform length in the rotation direction of the magnetic pole of the other pair of magnetic poles or alternatively a position of the outside auxiliary pole magnet is adjusted; or (c-2) the starting position may be adjusted in such a manner that lengths in the rotation direction of the pole teeth, which are arranged like the teeth of a comb, of a pair of stator yokes may be partially made to be not uniform.

Specifically, in an inner rotor type stepping motor for generating vibration of the invention, the rotor includes a shaft, a magnet and a rotor frame; the rotor frame is formed into a substantial cup-shape including a disk portion having an opening at the center and also including a cylindrical portion continuously arranged at the periphery of the disk portion; and a weight portion is arranged in a portion of the rotor frame so that the gravity center of the rotor frame can be located at a position eccentric with respect to the center of the rotor frame. A ring magnet, in which a plurality of pairs of magnetic poles having N-poles and S-poles are annularly arranged, is provided in the shaft. The stator includes an annular stator coil and stator yokes for holding the stator coil from both sides in state in which he(?) pole teeth are meshed in a comb-like arrangement. The magnet is opposed to the inner surface of the pole teeth inside in the radial direction, and the ring magnet of the rotor is provided inside the stator.

(A-2) In an inner rotor type stepping motor for generating vibration of the invention, in order to set the starting position at an appropriate position, a length in the rotation direction of each NS magnetic pole (a length of a magnetic pole in the rotation direction) of at least a pair of magnetic poles in a plurality of pairs of the magnetic poles composing the ring magnet is made to be different from a uniform length in the rotation direction of the respective magnetic poles of the other pair of the magnetic poles so as to conduct an adjustment.

(B-2) Alternatively, in an inner rotor type stepping motor for generating vibration of the invention, in order to set the starting position at an appropriate position, the starting position is adjusted in such a manner that lengths in the rotation direction of the pole teeth, which are arranged in the comb-like arrangement, of a pair of stator yokes is partially made to be not uniform.

Specifically, the following means for solution are adopted.

(1) In a stepping motor for generating vibration, which includes a stator and a rotor, the rotor includes a shaft, a magnet and a rotor frame, and the rotor frame is formed into a substantial cup-shape including a disk portion having an opening at the center and also the rotor includes a cylindrical portion continuously arranged at a periphery of the disk portion, and a weight portion is arranged in a portion of the rotor frame so that the gravity center of the rotor frame can be located at a position eccentric with respect to the center of the rotor frame.

(2) In a stepping motor for generating vibration according to the above item (1), the magnet is a ring magnet including a plurality of pairs of magnetic poles annularly arranged.

(3) In a stepping motor for generating vibration according to the above item (1) or (2), the stator includes: an annular stator coil; and a pair of stator yokes which holds the stator coil from both sides of the stator coil so that pole teeth of one of the stator yokes meshes with pole teeth of the other of the stator yokes in a comb-like arrangement, and the stator is disposed in the substantial cup-shaped rotor frame.

(4) In a stepping motor for generating vibration according to any one of the above items (1) to (3), the magnet is disposed inside the rotor frame including the weight portion.

(5) In a stepping motor for generating vibration according to the above item (3), the magnet of the rotor is opposed to the pole teeth, and the magnet is located at an outer side of the pole teeth in the radial direction (i.e., a radial direction of the rotor).

(6) In a stepping motor for generating vibration according to the above item (3), the magnet is opposed to the pole teeth, and the magnet is disposed on the shaft and located at an inner side of the pole teeth in the radial direction.

(7) In a stepping motor for generating vibration according to the above item (2), each magnetic pole in at least one pair of the plurality of magnetic poles has a length in the rotation direction (i.e., a rotation direction of the rotor), the length being different from a uniform length of each magnetic pole in the other pairs so that the rotor can start in one direction (that is, the rotor can always rotate in one direction at the time starting).

(8) In a stepping motor for generating vibration according to the above item (2), a position of an outside auxiliary pole magnet, which is used being combined with the ring magnet, is arranged so that the rotor can start in one direction.

(9) In a stepping motor for generating vibration according to the above item (3), a starting position of the rotor is adjusted by making widths of a pair of the pole teeth arranged in the comb-like arrangement to be different from each other so that the rotor can start in one direction.

(10) In a stepping motor for generating vibration according to any one of the above items (1) to (6), a cover is provided so that the rotor and the stator can be covered with the cover, the magnet includes a ring magnet and a auxiliary pole magnet, the auxiliary pole magnet is attached to the cover, and the starting position is adjusted by adjusting an attaching position of the auxiliary pole magnet so that the rotor can start in one direction.

A stepping motor for generating vibration of the invention provides the following advantages.

(1) In a portion of the rotor frame, the weight portion is integrally provided. Therefore, unlike the structure in which the weight portion is provided being different from the rotor frame, the weight portion can be arranged in a portion including a space which is to be originally occupied by the rotor frame. Therefore, while the original shape of the rotor frame is being maintained, the mass of the weight portion can be increased. Accordingly, while a preferable shape is being maintained, a strong vibration can be generated.

(2) Since the rotor frame and the weight portion are used as a back yoke, it is possible to enhance the efficiency of utilizing the magnetic flux generated by the motor. Accordingly, the starting, the stopping and the rotating speed characteristic can be improved and the mobility can be enhanced. Further, the size of the weight portion can be extended in accordance with the size of the rotor frame so as to increase the imbalance and a high intensity of vibration can be generated.

(3) The magnet includes a ring magnet or a ring magnet and an outside auxiliary pole magnet, and the starting position is adjusted in such a manner that a length in the rotation direction of each magnetic pole NS (a length of a magnetic pole in the rotation direction) of at least one pair of magnetic poles in a plurality of magnetic poles in the ring magnet is made to be different from a uniform length in the rotation direction of the magnetic pole of the other pair of magnetic poles or alternatively a position of the outside auxiliary pole magnet is adjusted. Therefore, the number of parts for adjustment can be decreased. By the outside auxiliary pole magnet, the starting position can be adjusted at the most appropriate position after the completion of manufacturing the motor. Further, the accumulated error can be reduced. Accordingly, as a whole, the assembling accuracy can be enhanced.

(4) The starting position and the stopping position can be adjusted in such a manner that lengths in the rotation direction of the pole teeth, which are arranged in the comb-like arrangement, of a pair of stator yokes are partially made to be not uniform. Therefore, the adjustment can be made without reducing the generated torque and the number of parts.

BRIEF DESCRIPTION OF THE DRAWINGS

FIGS. 6A is a view showing characteristic diagrams of a stepping motor for generating vibration in which the starting position adjusting means (3) of Embodiment 4 is provided, and FIG. 6B is a view showing characteristic diagrams of a stepping motor for generating vibration in which the starting position adjusting means (3) is not provided.

FIGS. 8A to 8C are arrangement views showing a flat coreless type vibration motor in the related art.

DETAILED DESCRIPTION OF THE INVENTION

Figure 1A:
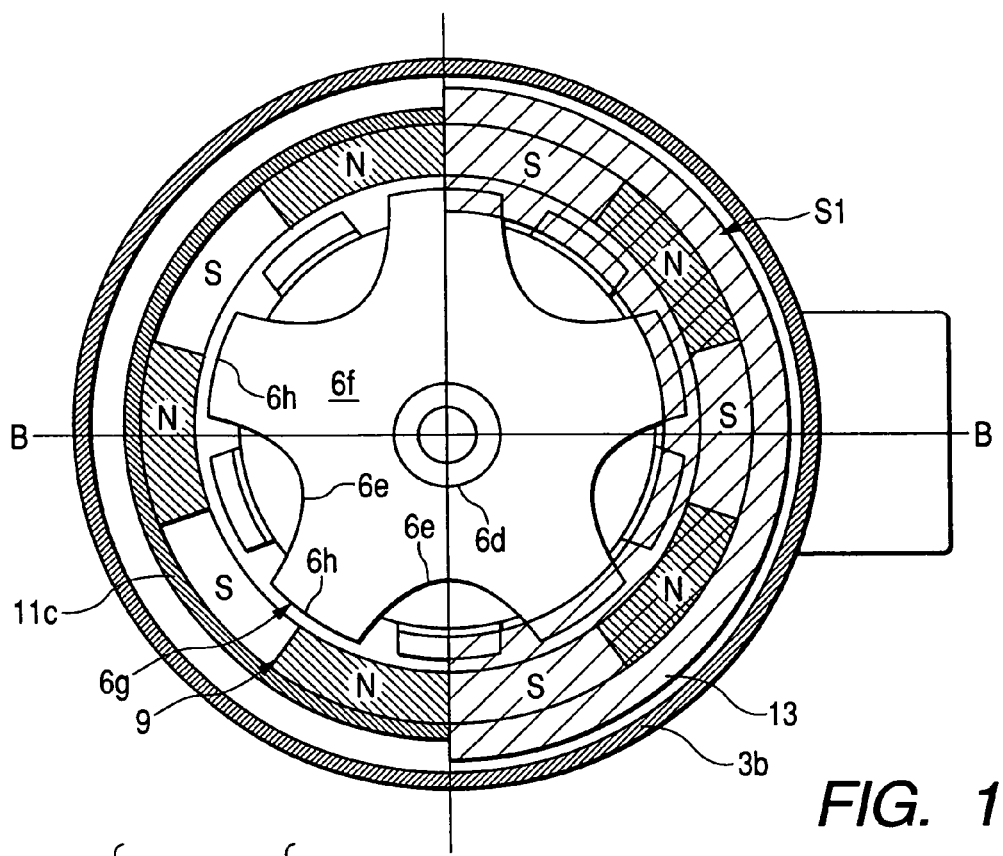
FIGS. 1A to 1C are arrangement views of an exemplary embodiment of an outer rotor type stepping motor for generating vibration of the invention.

Referring to the drawings, exemplary embodiments of the invention will be explained in detail.

EMBODIMENT 1

Figure 1C:
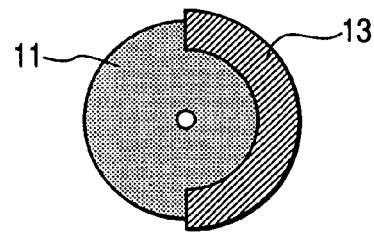
Figure 1B:
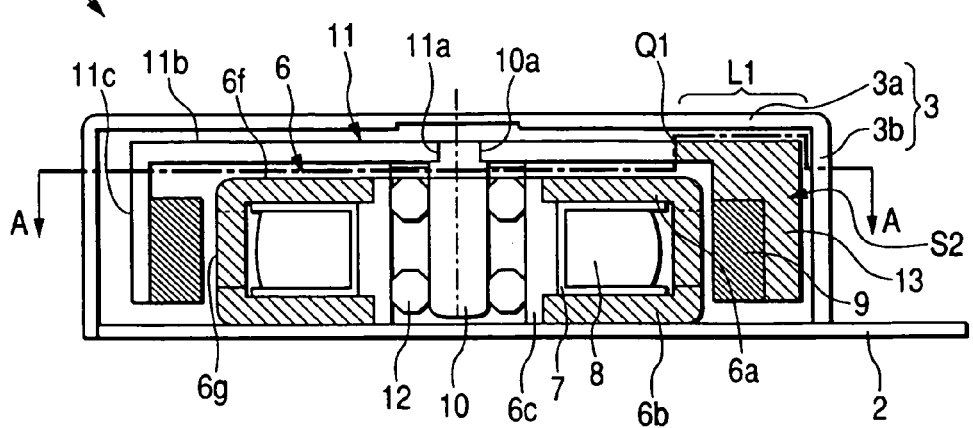

FIGS. 1A to 1C are arrangement views of an exemplary embodiment of an outer rotor type stepping motor for generating vibration which is a basic stepping motor for generating vibration of the invention. FIG. 1A is a sectional view taken on line A-A in FIG. 1B, FIG. 1B is a sectional view taken on line B-B in FIG. 1A, and FIG. 1C is a plan view of a rotor frame. An outer rotor type stepping motor 1 for generating vibration includes an interface base board 2, cover 3, rotor 4 and stator 5.

In the interface board 2, an insulating film is provided on a metallic plate, necessary wiring such as a feeder connected to a coil is provided on the insulating film, and an opening (not shown) engaged with a protrusion (not shown) of the cover 3 is formed. A second stator yoke 6b on the interface board 2 side of a stator yoke 6 and a center yoke 6c, which becomes a third stator yoke, are fixed onto the interface board 2. A protrusion (not shown) on the end face of a cylindrical portion 3b of the cover is engaged in the opening and soldered onto the reverse side of the interface board 2. An outside control circuit and an electric power source are connected to the wiring.

The stator 5 includes: a stator coil 8 wound around a coil bobbin 7; and the stator yoke 6 including a first stator yoke 6a, the second stator yoke 6b and the center yoke 6c which is the third stator yoke.

The stator yoke 6 is made of magnetic material. The stator yoke 6 includes: the first stator yoke 6a having pole teeth; and the second stator yoke 6b having pole teeth; and the center yoke 6c for supporting the first stator yoke 6a and the second stator yoke 6b and forming a magnetic path together with the first stator yoke 6a and the second stator yoke 6b. Embodiment 1, lengths of the pole teeth in the rotation direction are all the same.

As shown in the plan view of FIG. 1A, the first stator yoke 6a and the second stator yoke 6b have an opening 6d, the entire shape of which is formed into a cup-shape, and cutout portions 6e. Specifically, at the center of the cup-shape in which a cylindrical portion 6g is provided at the periphery of a disk portion 6f, the opening 6d is formed. The substantially U-shaped cutout portions 6e, the number of which is five, respectively having an opening at the open end portion which is located from the cylindrical portion 6g of the cup-shape to the disk portion 6f, are provided at regular intervals. Residual portions located between the substantially U-shaped cutout portions 6e are pole teeth 6h. The open ends of the substantially U-shaped cutout portions 6e are made to agree with the free end portions of the cup-shaped cylindrical portion 6g. The shape of the substantially U-shaped cutout portion 6e is determined as a result of appropriately deciding the shape of each pole tooth 6h.

The first stator yoke 6a and the second stator yoke 6b are arranged in an upper and a lower portion so that the pole teeth of both yokes 6a, 6b can be meshed with each other in a comb-like arrangement. Between the first stator yoke 6a and the second stator yoke 6b, the coil bobbin 7 is arranged in which the stator coil 8 is housed. The stator yoke 6, which includes the first stator yoke 6a, the second stator yoke 6b and the center yoke 6c, is arranged so that it can cover the periphery of the annular stator coil 8.

The stator 5 includes: the annular stator coil 8; and the stator yoke 6 for holding the annular stator coil 8 from both sides under the condition that the pole teeth 6h are meshed with each other in the comb-like arrangement, and a ring magnet 9 of the rotor 4 described later is opposed to the pole teeth and located at an outer side of the pole teeth in the radial direction.

The coil bobbin 7 is made of resin, and the cross section of the coil bobbin 7 is a C-shape. When the coil bobbin 7 is expressed in a plan view (not shown), it is formed into an annular shape. The stator coil 8 can include an arbitrary wire. Especially, the stator coil 8 is preferably formed from a self-bonding type wire. In the case of Embodiment 1, the stator coil 8 is formed into an annular coil in such a manner that the self-bonding type wire is wound around the annular coil bobbin 7 and heated so that a bonding layer can be melted and the self-bonding type wire can be integrated into one body. When the bonding layer is fused in this way, imbalance of the arrangement of the coil wound round the coil bobbing 7 can be suppressed, and the arrangement can be made uniform.

The rotor 4 includes a shaft 10, ring magnet 9 and rotor frame 11.

The shaft 10 has a small diameter protruding portion 10a which is formed into a step portion in the vicinity of one end portion. The diameter of the shaft 10 is, for example, 0.8 mm. The shaft 10 is inserted into and supported by a bearing 12 of the center yoke 6c.

The rotor frame 11 is formed into a substantial cup-shape including a disk portion 11b having an opening 11a at the center and a cylindrical portion 11c connected to the periphery of the disk portion 11b.

In this case, the reason why the terminology of the substantial cup-shape is used is described as follows. Since the weight portion is provided in a portion of the rotor frame 11, a protruded portion is necessarily formed in a portion except for the space in which the disk portion and the cylindrical portion of the uniform thickness are formed. Therefore, the rotor frame 11 is formed into a shape similar to a cup-shape. As shown in FIG. 1C, a weight portion 13 is integrally arranged in a portion of the rotor frame 11.

The rotor frame 11 is made of metal such as iron.

The small diameter protruding portion 10a of the shaft 10 is engaged in and fixed to the opening 11a of the rotor frame 11. At this time, the rotor frame 11 is arranged being separate from the first stator yoke 6a. The vicinity of the attaching base portion of the rotor frame 11, by which the rotor frame 11 is attached to the shaft 10, is supported by the spacer which is put on the bearing 12.

The ring magnet 9 is provided on the inside of the cylindrical portion 11c of the rotor frame 11. The ring magnet 9 includes five pairs of magnetic poles including N-poles and S-poles and these magnetic poles are annularly arranged.

The weight portion 13 is made of magnetic metal of high specific gravity. The weight portion 13 occupies a three-dimensional space which is defined by a partial annular region S1 in an angle range shown in the plan view of FIG. 1A and by a cross-sectional area S2 in the sectional view of FIG. 1B. The partial annular region S1 is a partial region located from the outer circumference of the disk portion 11b of the rotor frame 11 to a position which enters the inside in the radial direction by a width L1. In this case, the width L1 is defined as the width from the position on the outer circumference of the disk portion to a position Q1 which enters the inside in the radial direction exceeding the inside end in the radial direction of the weight portion 13 in FIG. 1B. The central angle of this weight portion 13 can be appropriately designed by the specific gravity of the material to be used. In the case of Embodiment 1, the center angle of this weight portion 13 is in the range from 120° to 200°. It is preferable that the center angle of this weight portion 13 is 180°.

In the case where the rotor frame 11 includes the disk portion 11b and the cylindrical portion 11c of uniform thickness, the weight portion 13 substantially includes the rotor frame 11 and the portion protruding inside. This weight portion 13 is welded to the rotor frame 11.

Concerning the vibration mechanism in which the rotor frame 11 having the weight 13 is arranged on the shaft 10, the vibration can be found by $mr\omega^2$ (centrifugal force), where the mass of the weight portion 13 is m (kg), the length from the center is r (m) and the rotating speed (angular velocity) is $\omega$. It is preferable that the vibration is about 1 G. Therefore, when the rotating speed is about 10,000 rpm, the most comfortable sensitivity can be obtained. Therefore, the outer rotor type, in which the length from the center to the weight portion 13 is long, is more advantageous than the inner rotor type. Since the weight portion 13 can be formed at an arbitrary position on the circumference of the rotor frame 11, manufacturing becomes easy. Since the weight portion 13 is arranged in the cylindrical portion 11c of the rotor frame 11, the wall thickness in the radial direction of the cylindrical portion 11c can be appropriately designed according to the mass required for the weight portion 13. Since the weight portion 13 has magnetism, the shielding effect can be provided by the weight 13 with respect to the external magnetic field.

The weight portion 13 is provided in a portion of the rotor frame 11 so that the gravity center of the rotor frame 11 can be eccentric from the center of the rotor frame 11. The weight portion 13 is made of metal such as Fe (iron), Cu (copper), Pb (lead) or W (tungsten). Alternatively, the weight portion 13 is made of alloy containing the above metals. Especially, it is preferable to use magnetic material containing W (tungsten:95 percent by weight), Cu (copper:2 percent by weight) and Ni (nickel:2 percent by weight).

The weight portion 13 may have an arbitrary shape as long as the shape can make up for the insufficient shape of the rotor frame 11 including the disk portion 11b and the cylindrical portion 11c of the uniform thickness and support the ring magnet 9.

The ring magnet 9 is made of an arbitrary magnetic material such as neodymium (Nd), iron (Fe), boron (B), samarium (Sm) or cobalt (Co). The ring magnet 9 includes a plurality of pairs of magnets having N-poles and S-poles, which are arranged in an annular shape. This ring magnet 9 is arranged inside the rotor frame 11 including the weight portion 13.

The number of the ring magnets 9 may be one at a minimum. In the case where the number of the ring magnets 9 is one, multiple poles are magnetized so that only one of the magnetized poles can be given the effect of a auxiliary pole. That is, the pole pitch of only one pole is shifted from that of the other poles. Alternatively, the gap of only one pole with respect to the pole teeth is made to be different and shifted from that of the other poles. However, the following form is included in the concept of "one ring magnet". Ten pairs of magnetic poles, which are respectively magnetized to be NS or SN in the radial direction from the axial center, are arranged and integrated on the inner circumferential face so that the different magnetic poles can be alternately positioned.

The ring magnet 9 is stuck to the rotor frame 11 and the weight portion 13 with adhesive. It is preferable to use adhesive having the ultraviolet ray curing characteristic.

The size of the ring magnet 9 is decided according to the necessary torque.

The ring magnet 9 is magnetized to be NS or SN around the axis in the circumferential direction (the rotation direction). In Embodiment 1, the length in the rotation direction (the arcuate length) of a single pole of N-pole or S-pole of the ring magnet 9 is all the same.

The cover 3 is made of non-magnetic metal such as SUS (stainless steel) 303. The cross section of the cover 3 is a C-shape. The entire cover 3 includes: a disk portion 3a; and a cylindrical portion 3b arranged perpendicularly at the periphery of the disk portion 3a. On the end face of the cylindrical portion 3b, several protrusions (not shown) for fixing the cylindrical portion 3b to the interface board 2 by means of soldering or welding are protruded. Concerning the cover 3, for example, the diameter is 10 mm and the height is 3 mm.

The control means for adjusting a starting position of the rotor described below can be applied to the above stepping motor for generating vibration. A specific example will be described in detail in Embodiments 2 to 4.

(A-1) In order to set the starting position of the rotor at an appropriate position, a length in the rotation direction of each magnetic pole NS (a length of the magnetic pole in the rotation direction) of at least a pair of magnetic poles in a plurality of magnetic poles in the ring magnet is made to be different from a uniform length in the rotation direction of the magnetic pole of the other pair of magnetic poles so as to adjust the starting position.

(B-1) In order to set the starting position of the rotor at an appropriate position, a position of the outside auxiliary pole magnet used in combination with the ring magnet is adjusted.

(C-1) In order to set the starting position of the rotor at an appropriate position, a length in the rotation direction of the pole teeth of a pair of stator yokes, which are arranged like in the comb-like arrangement, is adjusted so that the portion can be partially made to be not uniform.

(Drive Circuit)

A stepping motor for generating vibration of the invention is controlled by the speed characteristic of acceleration, constant speed and deceleration. For example, the speed is raised to the constant speed in 0.3 to 0.5 sec at the slow start.

The size of the entire motor is greatly reduced, and the single phase stepping motor is applied to a stepping motor for generating vibration. Since the most preferable vibration can be provided when the vibration is 1 G, it is preferable that the rotating speed is 10,000 rpm.

When an acceleration of 1 G is applied to the rotary shaft, the rotating speed is raised to the maximum value. It is preferable that the deceleration time in the falling is as short as possible.

Since the acceleration is in the middle course of the process to reach the maximum speed (the constant speed), no problems of vibration are caused in the step driving. However, the deceleration is the process to stop the motor from rotating. Therefore, problems of vibration are caused. The exciting time depends on the maximum drive current. Therefore, at the time of acceleration and constant speed in which no problems of vibration are caused in the vibration, in order to drive at high speed, the maximum drive current is made to be a large current. At the time of deceleration, the motor is stopped according to the holding torque.

The annular stator coil 8 of the single phase is fed with a current by the drive circuit, the flowing direction of which is alternately changed.

In order to conduct the speed control, a pulse signal used for controlling is controlled by the pulse width modulation (PWM), the pulse frequency modulation (PFM) or the pulse amplitude modulation (PAM).

(Starting Position Adjusting Means)

All the starting position adjusting means will be explained below.

Since the stepping motor 1 for generating vibration of the invention uses the stator coil 8 of the single phase, after the drive current supplied to the stator coil 8 is turned off (OFF), it is necessary to move the rotor 4 so that the rotation direction can become the same when the motor is started next time.

In order to decide the rotation direction, the following items (1) to (5) are employed.

(1) The ring magnet 9 is provided with a ring magnet including pairs of magnetic poles, the magnetic pole pitch (interval) of which is the same as the pitch of the pole teeth 6h of the stator yoke 6, and also provided with the auxiliary pole magnet, the pitch of which is shifted in the rotation direction. It is set that (A quantity of magnetic flux of the ring magnet)<(A quantity of magnetic flux of the auxiliary pole magnet).

(2) The magnetic pole pitch of at least one pair of magnetic poles of the ring magnet 9 is made to be different from the pitch of the pole teeth of the stator yoke 6.

(3) The pole teeth phase of a pair of stator yokes 6a and 6b is shifted. Alternatively, the pole teeth shape of the stator yoke 6 is made to be not symmetrical.

(4) The gap formed between the pole teeth 6h of the stator yoke 6 and the ring magnet 9 is made to be not uniform.

(5) The auxiliary pole magnet is made to be a single pole.

A specific example of the above items (1) to (3) is explained in Embodiments 2 to 4 described below.

(Advantage Provided by Embodiment 1)

An outer rotor type can provide the following advantages. Since the weight portion 13 is provided in a portion of the rotor frame 11, the rotor frame 11 and the weight portion 13 can have a housing space in common, and the weight portion 13 can be arranged on the outermost side of the rotating portion. Accordingly, the radius can be extended. Therefore, a strong vibration can be generated. Since the stepping motor has no brushes, maintenance is seldom necessary in the same manner as that of the other brushless motors, and the life can be prolonged.

When the rotating speed is controlled so that it can be synchronized with the input pulse, the vibration can be linearly adjusted and further the stopping time can be reduced.

Since the motor is of the single phase, a drive pulse current, the flowing direction of which is alternately inverted, is inputted into the one phase stator coil 8 wound around the stator yoke 6. Since this coil is of the single phase, the space occupied by the coil is small. Therefore, the thickness of the motor can be reduced. The control circuit is basically an inverse circuit in which the current is inverted. Therefore, the circuit can be made simple.

EMBODIMENT 2

Figure 2A:
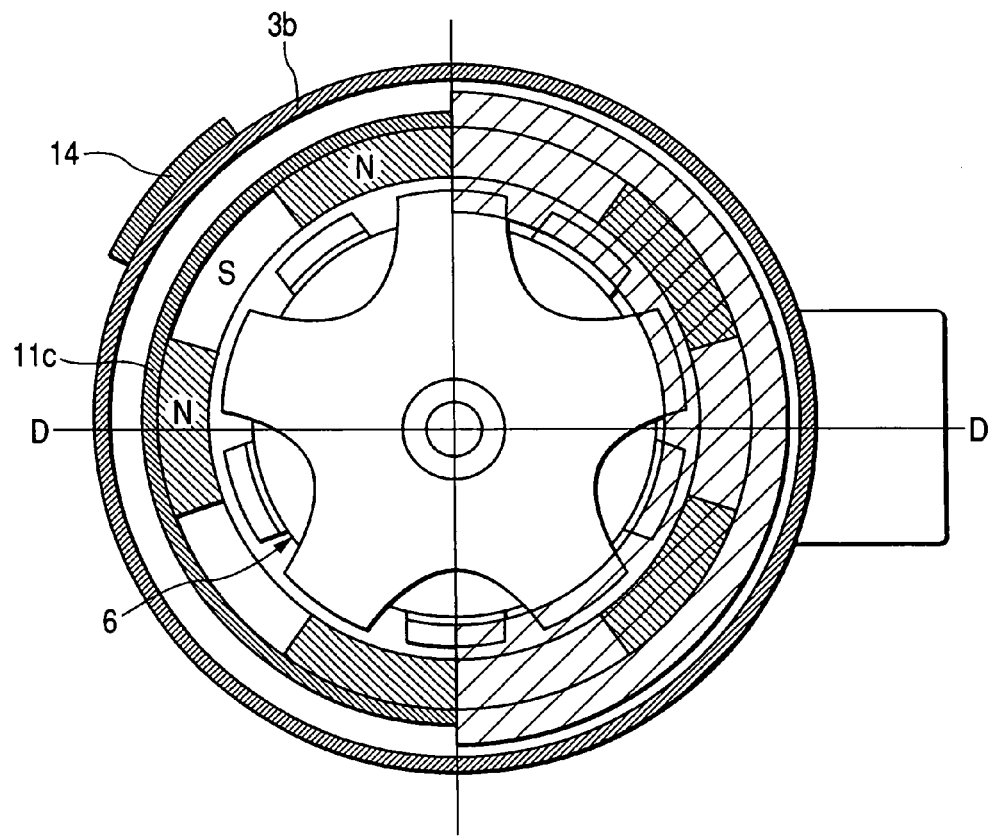
FIGS. 2A and 2B are arrangement views showing a starting position-adjusting means (1) of the invention.
Figure 2B:
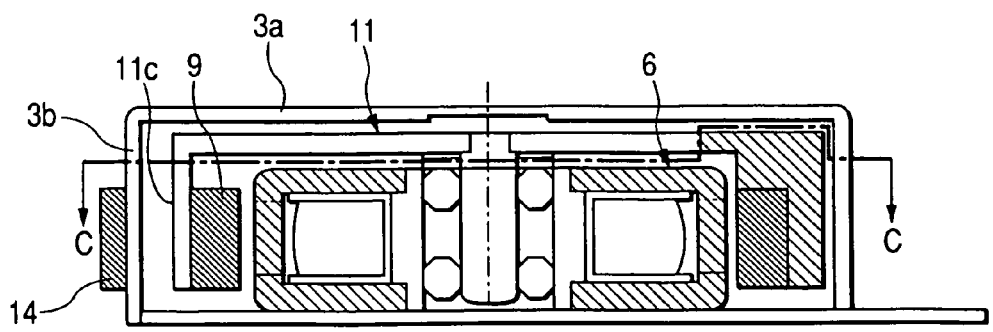

FIGS. 2A and 2B are arrangement views showing a starting position-adjusting means (1) of the invention. FIG. 2A is a sectional view taken on line C-C in FIG. 2B, and FIG. 2B is a sectional view taken on line D-D in FIG. 2A.

Like reference characters are used to indicate like parts in Embodiments 1 and 2, and the same explanations are omitted here. An arcuate length of a auxiliary pole magnet 14 is smaller than the pole teeth pitch of the stator yoke 6. The auxiliary pole magnet 14 is magnetized to be N-pole and S-pole in the radial direction. The auxiliary pole magnet 14 has a function of shifting a stopping position of the rotor 4 after the exciting current of the stator coil 8 has been turned off. The auxiliary pole magnet 14 can be arranged at an arbitrary position on the cover 3 as long as the predetermined function can be exhibited by the auxiliary pole magnet 14 at the position.

Explanations will be made into the operation by which the rotor 4 is moved from the stopping position to the starting position by the auxiliary pole magnet 14 so that the rotor 4 can be always rotated in the same direction.

Specifically, the operation is conducted as follows. After the drive current of driving the stator coil 8 has been turned off and the rotor 4 has been stopped, a pair of the ring magnets 9 are attracted and repulsed by the auxiliary pole magnet 14. Next, the pair of magnetic poles is moved in the rotation direction by a distance so that a magnetic path can be formed between the adjoining pole teeth of the stator yoke 6 when a current flows in the stator coil 8 and the rotor 4 can be moved in the normal rotating direction. In this way, the rotor 4 is moved to the next starting position.

FIG. 2A is a view showing a state in which the ring magnet 9 is rotated by the action of the auxiliary pole magnet 14 by an angle corresponding to the starting position in the stopping state.

Usually, N-pole or S-pole of the ring magnet 9 is arranged being opposed to the respective pole teeth 6h of the stator yoke 6 at the stopping position. At this time, by a magnetic force of the auxiliary pole magnet 14, one magnetic pole of the ring magnet 9 is attracted to a position opposed to one magnetic pole of the auxiliary magnet 14. This state is shown in the drawing. When a current is made to flow in the stator coil 8 in this state, the magnetic pole of the ring magnet 9 is attracted and repulsed by the pole teeth and rotated in the normal rotation direction.

A quantity of the magnetic flux of the auxiliary pole magnet 14 is set to be larger than a quantity of the magnetic flux of the ring magnet 9.

Next, when the stator coil 8 is driven again, the flowing direction of the last drive current is stored so that it can be used as data, and the flowing direction of the drive current is decided according to the data so that the rotating direction can be the same.

EMBODIMENT 3

Figure 3A:
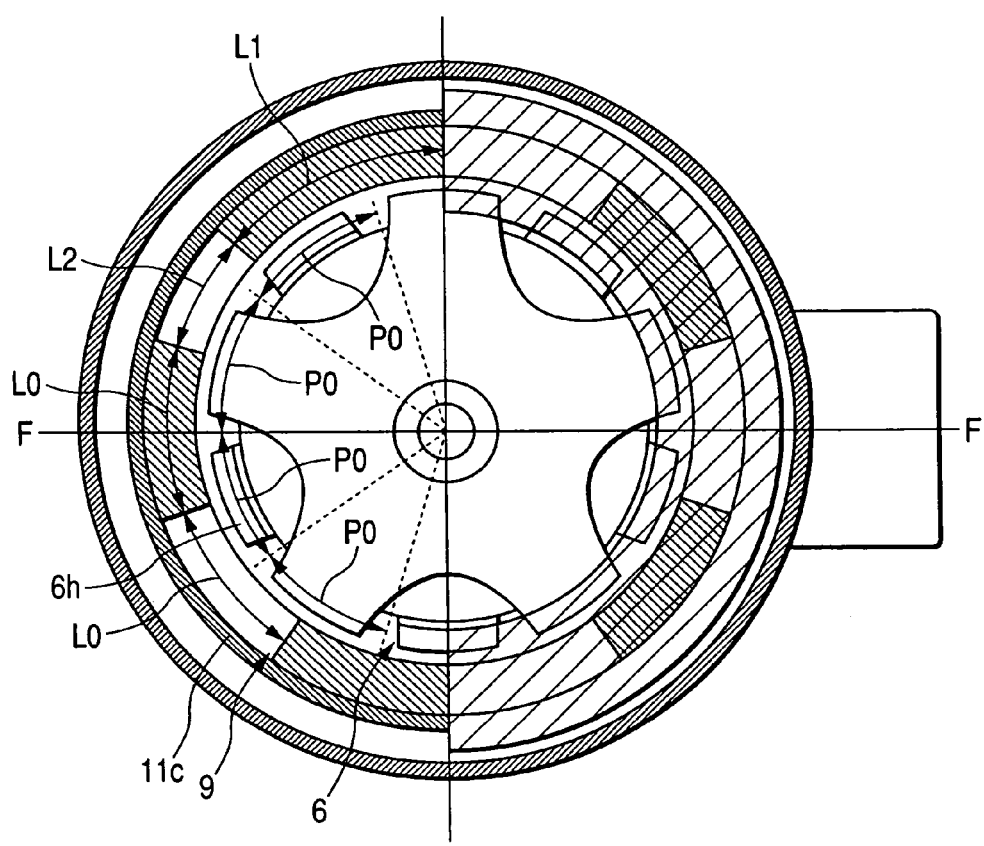
FIGS. 3A and 3B are arrangement views showing a starting position-adjusting means (2) of the invention.
Figure 3B:
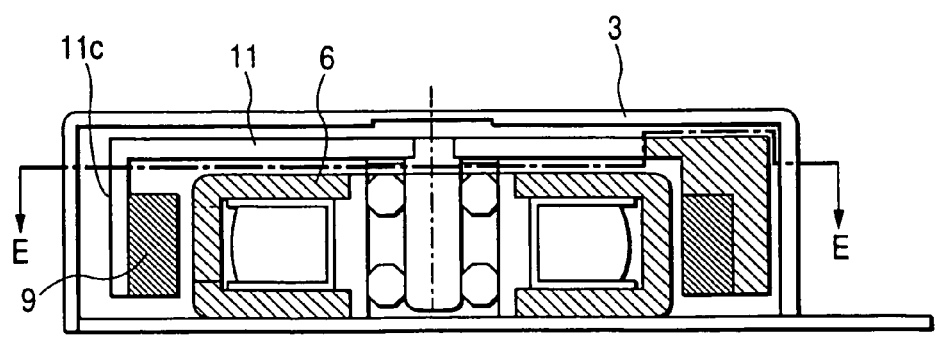

FIGS. 3A and 3B are arrangement views showing a starting position-adjusting means (2) of the invention. FIG. 3A is a sectional view taken on line E-E in FIG. 3B, and FIG. 3A is a sectional view taken on line F-F in FIG. 3B.

Like reference characters are used to indicate like parts in Embodiments 1 and 2, and the same explanations are omitted here. Magnetic pole pitches L1, L2 of N-pole and S-pole in at least one pair of magnetic poles of the ring magnet 9 are made to be not uniform compared with a magnetic pole pitch L0 of the other pair of the magnetic poles.

In this case, the ring magnet 9 includes one annular magnet formed by the multi-pole magnetization. Alternatively, the ring magnet 9 includes ten pairs of magnets, which are magnetized to be NS or SN in the radial direction from the axial center and are arranged and integrated into a ring shape so that the magnets can be alternately different magnetic poles along the inner circumferential face.

In FIG. 3A, the length (L0+L0) of the pair of magnetic poles of the ring magnet 9 is opposed to the pole teeth pitch (2P0) of the two pole teeth of the stator yoke 6. FIG. 3A shows a state in which the ring magnet 9 is moved so that the ring magnet 9 can be magnetically stabilized after the current of the stator coil 8 has been turned off and the magnetic resistance can be minimized. That is, the ring magnet 9 is moved so that the pair of magnetic poles (the magnetic poles, the lengths of which are L1 and L2) of the ring magnet 9, the magnetic pole pitch of which is made to be not uniform, can be magnetically stabilized with respect to a pair of pole teeth 6h of the stator yoke 6 and the magnetic resistance can be minimized. At this time, the ring magnet 9 is moved so that the magnetic pole (in this example, the magnetic pole, the length of which is L1) having a long arcuate length in the pair of magnetic poles, the pitch of which is changed, can be magnetically stabilized with respect to the pole teeth 6h of the stator yoke 6 and the magnetic resistance can be minimized. As a result, the state becomes as shown in the sectional view of FIG. 3A.

Next, when the stator coil 8 is driven in this state, the motor starts rotating in a predetermined direction.

EMBODIMENT 4

Figure 4A:
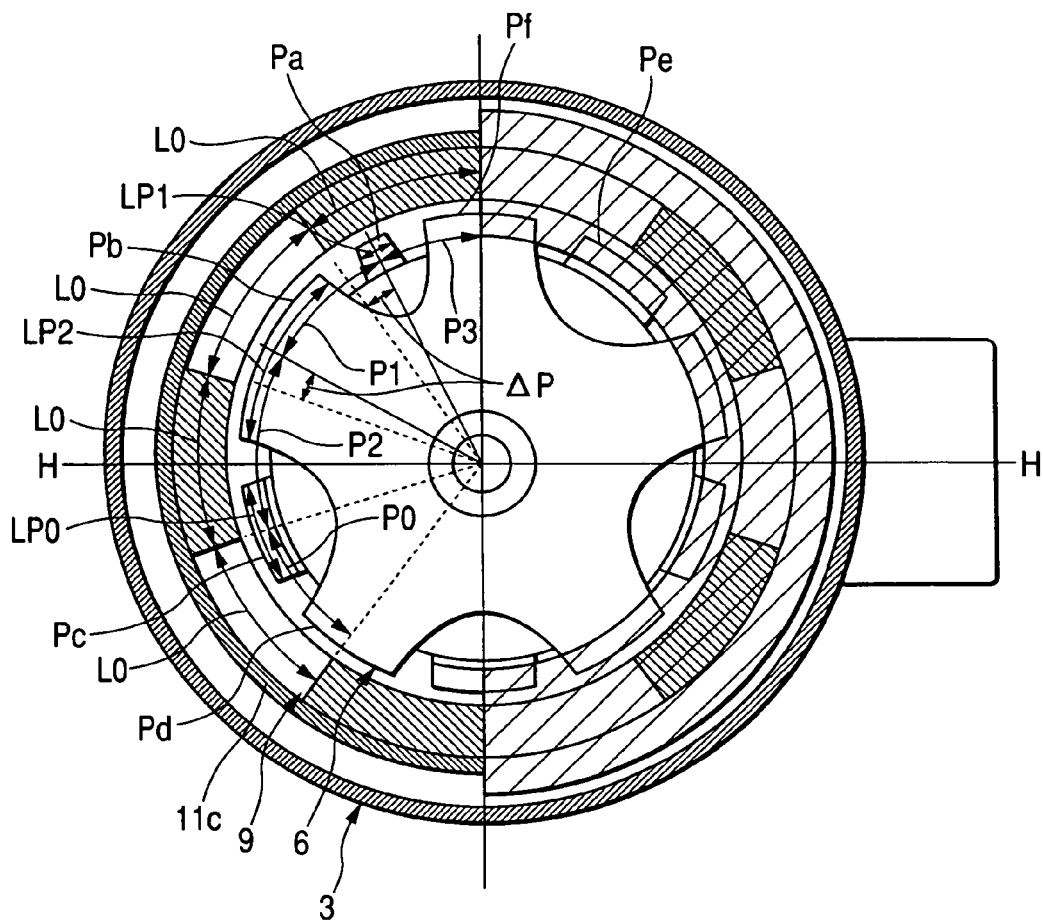
FIGS. 4A and 4B are arrangement views showing a starting position-adjusting means (3) of the invention.
Figure 4B:
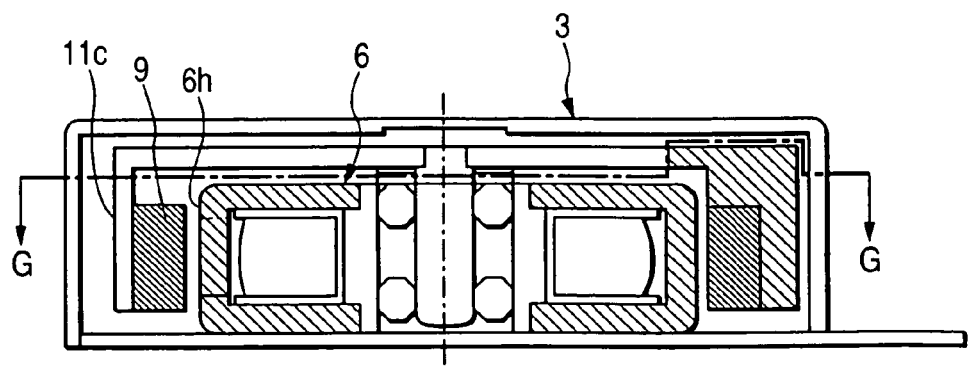

FIGS. 4A and 4B are arrangement views showing a starting position-adjusting means (3) of the invention. FIG. 4A is a sectional view taken on line G-G in FIG. 4B, and FIG. 4B is a sectional view taken on line H-H in FIG. 4A.

Like reference characters are used to indicate like parts in Embodiments 1 and 4, and the same explanations are omitted here. The starting position adjusting-means (3) of the invention is composed in such a manner that the pole tooth phase of a pair of stator yokes is shifted or the pole tooth shape of the stator yoke is made to be not symmetrical.

In this Embodiment 4, explanations are made into an example in which the pole tooth phases of a pair of stator yokes 6 are shifted from each other. As a result, the pole tooth shape is made to be not symmetrical.

In FIG. 4A, all the five pairs of magnetic poles of the ring magnet 9 are uniformly magnetized, that is, the length in the rotation direction of the magnetic pole is the uniform length L0. On the other hand, concerning the pole teeth of a pair of stator yokes 6, the pole tooth phase of only one pair of pole teeth (Pa, Pb) is shifted as a pole tooth pitch which is not uniform. That is, compared with a case in which the pitch (interval) with the adjoining pole tooth pair is uniform in the other pole tooth pair, the pitch of only this pole tooth pair (Pa, Pb) with the adjoining pole tooth pair (Pc, Pd) is P2, which is larger than the average pitch P0, and the other pitch with the adjoining pole tooth pair (Pe, Pf) is P3, which is smaller than the average pitch P0. As a result, the pitch is formed to be not uniform. At this time, the center position of the pole tooth Pb is a position of the solid line which is extended clockwise by an angle ΔP with respect to the position of the dotted line of the uniform pitch. Accordingly, the center position of the pole tooth Pa is a position of the solid line which is extended clockwise by the angle ΔP with respect to the position of the dotted line of the uniform pitch. As a result, the pole tooth Pa becomes shorter than a length LP0 of the pole tooth in the case where a length LP1 in the rotation direction of the pole teeth is uniform, and the pole tooth Pb becomes longer than the length LP0 of the pole tooth in the case where a length LP2 in the rotation direction of the pole teeth is uniform.

Therefore, the pole teeth Pa and Pb are arranged in an imbalanced state (at an irregular interval) in the center angle range for one magnetic pole pair. As a result, the occupied spaces are different, and the widths of the pole tooth are different from each other. In this connection, a plurality of pole tooth pairs, the pitch of which is not uniform, may be provided.

In Embodiment 4, the pole teeth of the respective stator 6 are five pole teeth. Therefore, the pole teeth of both stator yokes are ten pole teeth. Therefore, concerning one pole tooth pitch P0 of the uniform width, P0=360°/10=36°. However, concerning the other pole tooth pitch P2 which is not uniform, in order to obtain a predetermined advantage, P2=36°+9°+α°. However, −6≦α≦+6. In this case, "α" is selected according to the detent torque characteristic, the magnetic permeability of the stator yoke 6, the magnetic resistance and the intensity of the magnetic force of the ring magnet. It is preferable that the value of "α" is zero.

When the pole tooth pitch of one magnetic pole pair with the adjoining magnetic pole pair of the stator yoke 6 is increased by 9° compared with the usual case so that the pole tooth pitch can be made to be not uniform, the pole tooth width (the length in the rotation direction) of one pole tooth Pb of a pair of pole teeth, the pole tooth pitch of which is not uniform, becomes large (for example, 1.5 times as large as the pole tooth width of the uniform pole tooth pitch), and the pole tooth width of the other pole tooth Pa becomes small (for example, 0.5 times as small as the pole tooth width of the uniform pole tooth pitch).

As described above, when the average pitch between the adjoining pole tooth pairs is made to be a reference, the pole teeth are arranged on the circumference and only an arbitrary pole tooth pair is moved by a predetermined angle with respect to the reference angle. As a result, the detent torque characteristic is changed, for example, as shown in FIGS. 6A and 6B. Therefore, the starting position can be adjusted so that it can be rotated in one direction at the time of starting. The torque characteristic shown in FIGS. 6A and 6B are composed of data shown on Table 1.

FIGS. 6A is a view showing characteristic diagrams of a stepping motor for generating vibration, in which the starting position adjusting means (3) of Embodiment 4 is provided, and FIG. 6B is a view showing characteristic diagrams of a stepping motor for generating vibration in which the starting position adjusting means (3) of Embodiment 4 is not provided.

FIG. 6A shows a torque characteristic (detent torque characteristic) of the input (applied) voltage 0 V and a torque characteristic of the input (applied) voltage 4 V in the case of the standard yoke in which the pole tooth pitch of a pair of stator yokes and the magnetic pole pitch of the ring magnet are made to be a uniform value.

FIG. 6B shows a torque characteristic (detent torque characteristic) of the input (applied) voltage 0 V and a torque characteristic of the input (applied) voltage in the case of the offset yoke in which the pole tooth pitch of a pair of stator yokes is changed so that it can function as a starting position adjusting means.

In FIG. 6A, the detent torque is zero at the angles of 0°, 18°, 36°, 54° and 72°. On the other hand, when the angle is shifted by 4°, the detent torque becomes zero at the angles of 4°, 22°, 40° and 58°. According to the data described above, it can be understood that the starting characteristic can be improved when the pole tooth pitch is advanced by about 9°.

TABLE 1

| | Torque characteristic ($\times 10^{-4}$ Nm) | | |
|---|---|---|---|
| | | Input 0 V | |
| Angle (deg) | Input 4 V | Standard Yoke | Offset Yoke |
| 0 | 2.4 | 0.1 | 0.1 |
| 6 | 2.0 | −0.2 | 0.1 |
| 12 | 1.7 | −0.1 | −0.2 |
| 18 | 0.1 | 0.1 | −0.1 |
| 24 | −1.5 | 0.2 | 0.1 |
| 30 | −1.8 | 0.3 | 0.2 |
| 36 | −2.3 | 0.1 | 0.3 |
| 42 | −2.8 | −0.2 | 0.1 |
| 48 | −2.6 | −0.1 | −0.2 |
| 54 | 0.1 | 0.1 | −0.1 |
| 60 | 2.8 | 0.2 | 0.1 |
| 66 | 3.0 | 0.3 | 0.2 |
| 72 | 2.4 | 0.1 | 0.3 |

EMBODIMENT 5

Figure 5A:
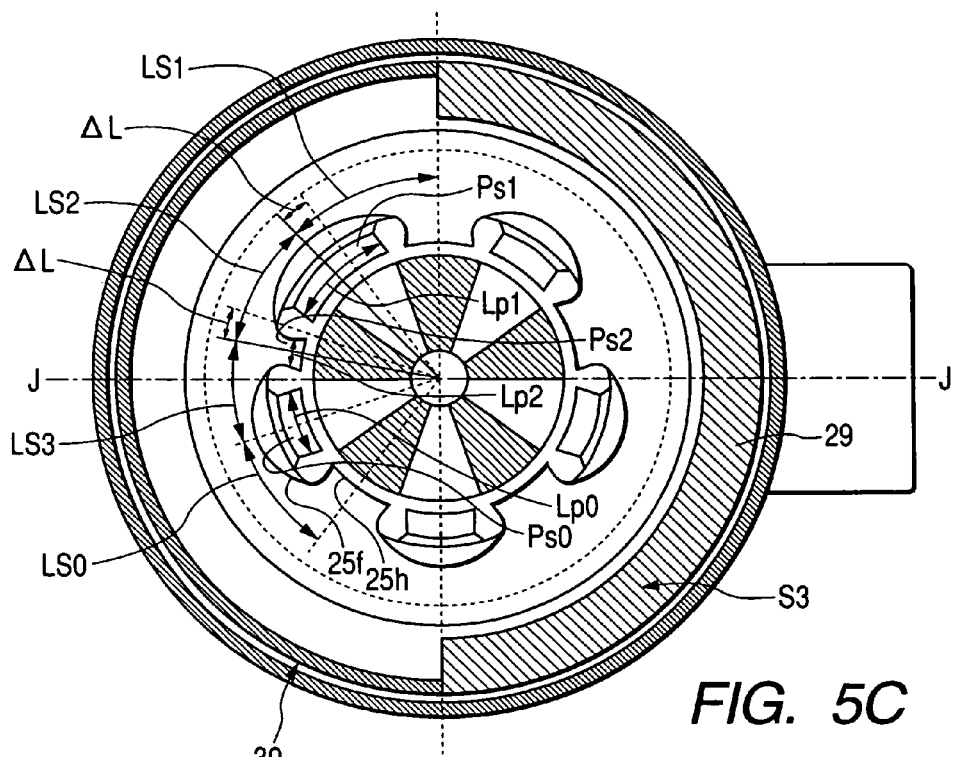
FIGS. 5A to 5C are arrangement views of an exemplary embodiment of an inner rotor type stepping motor for generating vibration of the present invention.
Figure 5C:
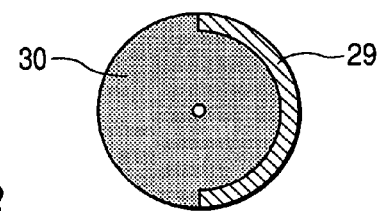
Figure 5B:
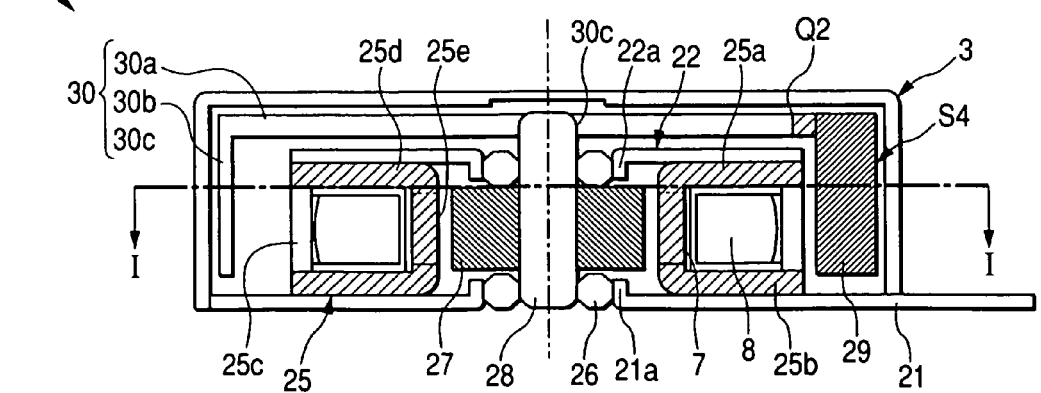
Figure 7A:
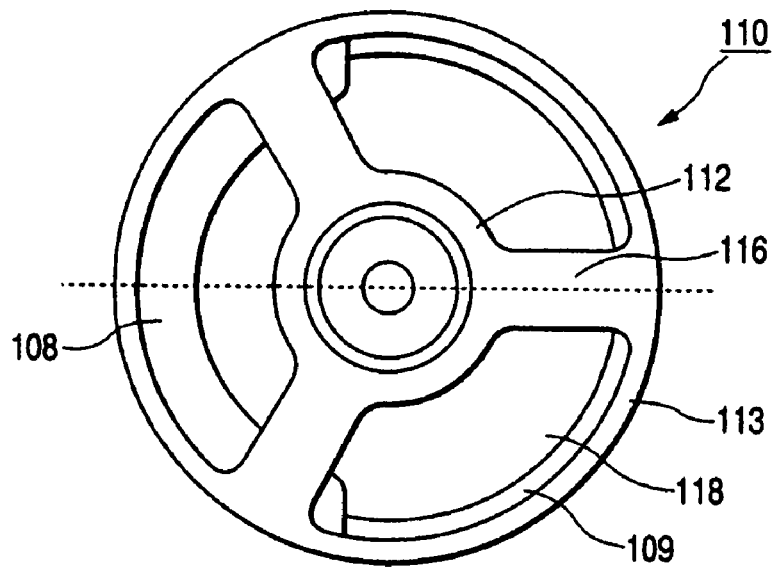
FIGS. 7A to 7C are arrangement views showing a flat type vibration motor in the related art.
Figure 7B:
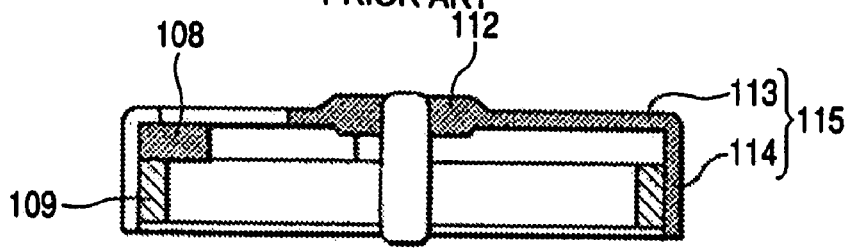
Figure 7C:
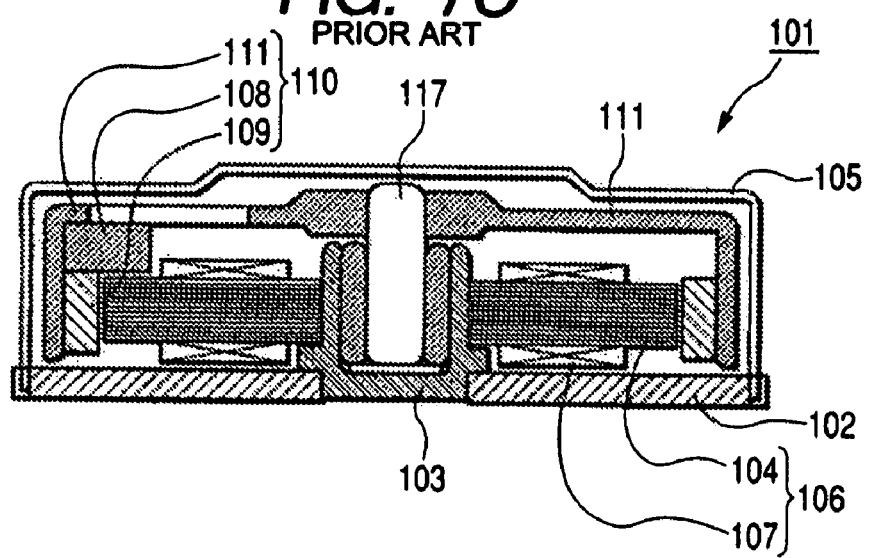
Figure 9A:
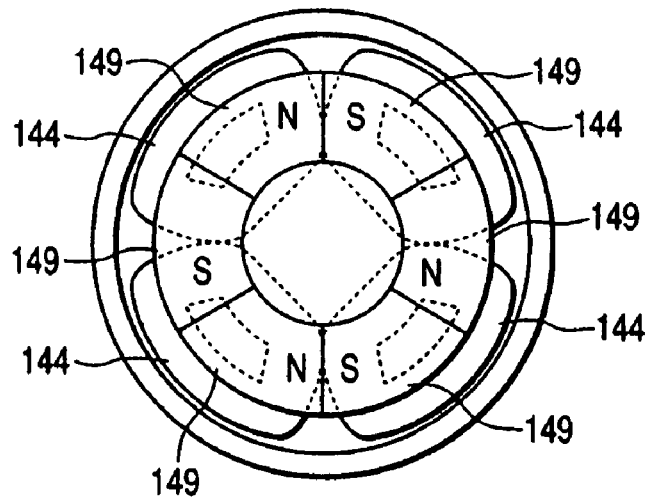
FIGS. 9A to 9C are arrangement views showing a vibration motor in which a stepping motor in the related art is used.
Figure 9B:
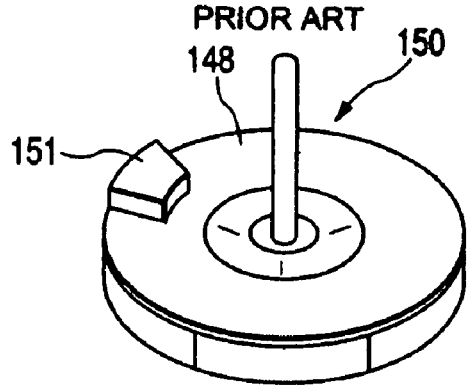
Figure 9C:
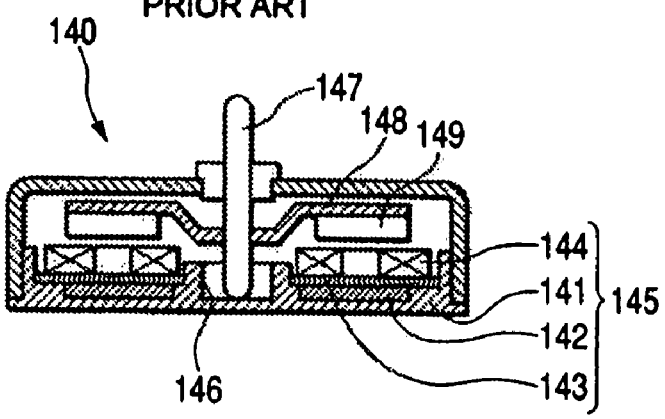

FIGS. 5A to 5C are arrangement views showing an exemplary embodiment of an inner rotor type stepping motor for generating vibration of the invention.

FIG. 5A is a sectional view taken on line I-I in FIG. 5B, FIG. 5B is a sectional view taken on line J-J in FIG. 5A, and FIG. 5C is a plan view of the rotor frame.

An inner rotor type stepping motor 20 for generating vibration includes an interface board (I) 21, a base board 22 for bearing use, a cover 3, a rotor (I) 23, and a stator (I) 24. Like reference characters are used to indicate like parts in Embodiments 1 and 5, and the same explanations about the material as those of Embodiment 1 are used here. For example, the material and characteristic of the interface board (I) are the same as those of the interface board of Embodiment 1 and only the structure is different, and the same explanations are omitted here. Characteristics of Embodiment 5 different from those of Embodiment 1 will be explained here.

The interface board (I) has the same characteristic as that described in Embodiment 1. At the center of the interface board (I) 21, an opening is formed being defined by a rising portion 21a.

The base board 22 for bearing use is composed of a printed circuit board. At the center of the base board 22 for bearing use, an opening defined by a falling portion 22a is formed. The base board 22 for bearing use is fixed onto the upper side of a first stator yoke (I) 25a.

A bearing (I) 26 is provided inside the rising portion 21a of the interface board (I) 21 and inside the falling portion 22a of the base board 22 for bearing use.

A stator (I) 24 includes: a stator coil 8 wound around a coil bobbin 7; and a stator yoke (I) 25 including the first stator yoke (I) 25a, a second stator yoke (I) 25b and a third stator yoke (I) 25c.

The stator yoke (I) 25 includes: the first stator yoke (I) 25a; the second stator yoke (I) 25b; and the third stator yoke (I) 25c for supporting the first stator yoke (I) 25a and the second stator yoke (I) 25b and for forming a magnetic path together with them, wherein each of the first stator yoke (I) 25a and the second stator yoke (I) 25b has pole teeth 25h. In Embodiment 5, lengths Lp1, Lp2 in the rotation direction of a pair of pole teeth Ps1, Ps2 are formed being different from the length Lp0 of the other pole tooth Ps0.

In Embodiment 5, the pole teeth 25h of the inner rotor type are formed inside (on the center side in the radial direction) the stator yoke (I) 25. From this viewpoint, Embodiment 5 is greatly different from Embodiment 1 in which the pole teeth of the outer rotor type are formed outside (outside in the radial direction) the stator yoke.

As shown in the plan view of FIG. 5A, in the first stator yoke (I) 25a and the second stator yoke (I) 25b, a cylindrical portion 25e is formed inside an annular plate portion 25d, and the pole teeth 25h are formed in a region from the cylindrical portion 25e to the annular plate portion 25d.

Specifically, the cylindrical portion 25e is formed inside the annular plate portion 25d, and substantially U-shaped cutout portions 25f, the number of which is five, are provided in a region from the cylindrical portion 25e to the annular plate portion 25d at regular intervals. The pole tooth 25h is formed between the residual substantially U-shaped cutout portions 25f. The opening end of the substantially U-shaped cutout portion 25f is made to agree with the free end of the cylindrical portion 25e. The shape of the substantially U-shaped cutout portion 25f is decided as a result of appropriately forming the pole tooth 25h.

The first stator yoke (I) 25a and the second stator yoke (I) 25b formed as described above are arranged in an upper and a lower portion so that the pole teeth 25h of the first stator yoke (I) 25a and the second stator yoke (1) 25b can be meshed with each other like in a comb-like arrangement. The coil bobbin 7 is provided in which the stator coil 8 is housed between the first stator yoke (I) 25a and the second stator yoke (I) 25b. The stator yoke 25 including the first stator yoke (I) 25a, the second stator yoke (I) 25b and the third stator yoke (I) 25c is arranged so that it can cover the periphery of the annular stator coil 8.

The stator (I) 24 includes the annular stator coil 8 and the pair of stator yokes (I) 25 for holding the stator coil 8 from both sides under the condition that the pole teeth 25h are meshed with each other in the comb-like arrangement, and a ring magnet (I) 27 of the rotor (I) 23 is arranged being opposed to the pole teeth 25h arranged inside in the radial direction of the stator yoke 25.

The cross section of the coil bobbin 7 is formed into a C-shape. When the coil bobbin 7 is expressed in a plan view (not shown), it is formed into an annular shape. The stator coil 8 can be composed of an arbitrary wire. Especially, the stator coil 8 preferably includes a self-bonding type wire. In the case of Embodiment 5, the stator coil 8 is formed into an annular coil in such a manner that the self-bonding type wire is wound around the annular coil bobbin 7 and heated so that the bonding layer can be melted and the self-bonding type wire can be integrated into one body. That is, the stator coil 8 is formed in such a manner that the self-bonding type wire is wound and fused to each other. When the bonding layer is fused in this way, imbalance of the arrangement of the coil wound around the coil bobbing 7 can be suppressed, and the arrangement can be made uniform.

The rotor (I) 23 includes a shaft (I) 28, the ring magnet (I) 27, and a rotor frame (I) 30.

The shaft (I) 28 is inserted into and supported by the bearing (I) 26. One end of the shaft (I) 28 is supported by the rotor frame (I) 30.

The rotor frame (I) 30 is formed into a substantial cup-shape including a disk portion 30a having an opening at the center and a cylindrical portion 30b continued to the periphery of the disk portion 30a. As shown in FIG. 3C, a weight portion (I) 29 is integrally provided in a portion of the rotor frame (I) 30. The cross section of the rotor frame (I) 30 is formed into a C-shape having an opening at the center. The entire rotor frame is formed into a cup-shape composed of the disk portion 30a having the opening at the center and having the cylindrical portion 30b arranged perpendicularly to the periphery of the disk portion 30a.

An opening portion 30c of the rotor frame (I) 30 is engaged with and fixed to the shaft (I) 28. At this time, the rotor frame (I) 30 is arranged being separate from the first stator yoke (I) 25a.

The ring magnet (I) 27 is arranged on the inner side face of the cylindrical portion 30b of the rotor frame (I) 30.

The ring magnet (I) 27 includes five pairs of magnetic poles having N-poles and S-poles which are annularly arranged at regular intervals.

A weight portion (I) 29 occupies a three-dimensional space defined by a partial annular region S in the predetermined angle range in the plan view of FIG. 5A and by a cross section S4 in the sectional view of FIG. 5B.

A partial annular region S3 is defined as a partial region arranged from the outer circumference of the disk portion 30a of the rotor frame (I) 30 into the inside in the radial direction by a width. In this case, the width is a width from the outer circumference of the disk portion 30a to a position Q2 which is located more inside in the radial direction with respect to the inside end in the radial direction of the weight portion (I) 29. The center angle of this weight portion (I) 29 can be appropriately designed by the specific gravity of metal, the specific gravity of which is high. In the case of Embodiment 5, the center angle of this weight portion (I) 29 is 120° to 200°. It is preferable that the center angle of this weight portion (I) 29 is set at 180°.

The weight portion (I) 29 is welded to the rotor frame (I) 30.

Concerning the vibration mechanism in which the rotor frame (I) 30 having the weight portion (I) 29 is arranged on the shaft (I) 28, the vibration can be found by $mr\omega^2$ (centrifugal force), where the mass of the weight portion (I) 29 is m (kg), the length from the gravity center is r (m) and the rotating speed (angular velocity) is $\omega$. It is preferable that the vibration is about 1 G. When the rotating speed is about 10,000 rpm, the most comfortable sensitivity can be obtained. Since the weight portion (I) 29 can be formed at an arbitrary position on the circumference of the rotor frame (I) 30, manufacturing can be easily conducted. Since the weight portion (I) 29 is arranged in the cylindrical portion 30b of the rotor frame (I) 30, the wall thickness in the radial direction of the cylindrical portion 30b can be appropriately designed according to the mass required for the weight portion (I) 29. Since the weight portion (I) 29 has magnetism, the shielding effect can be provided by the weight portion (I) 29 with respect to the external magnetic field.

The weight portion (I) 29 is provided in a portion of the rotor frame (I) 30 so that the gravity center of the rotor frame (I) 30 can be eccentric from the center of the rotor frame (I) 30. The material composition of the weight portion (I) 29 is the same as that of the weight portion 13 of Embodiment 1 described before.

The material composition of the ring magnet (I) 27 is the same as that of the ring magnet 9 of Embodiment 1 described before. The ring magnet (I) 27 is provided inside the rotor frame (I) 30 including the weight portion (I) 29. The magnetizing direction of the ring magnet (I) 27 can be set in an arbitrary direction. It is preferable that NS and SN are magnetized in the circumferential direction (the rotation direction) around the axis.

In Embodiment 5, a length (an arcuate length) in the rotation direction of the single magnetic pole of N-pole or S-pole of the ring magnet (I) 27 is all the same.

The material composition of the cover 3 is the same as that of the cover 3 of Embodiment 1.

In the same manner as that of Embodiments 2 to 4, in Embodiment 5, in order to decide the rotation direction, the following means (1) to (4) can be adopted.

(1) The ring magnet (I) 27 includes pairs of magnetic poles, the magnetic pole pitch of which is the same as that of the pole teeth 25h of the stator yoke (I) 25. A quantity of magnetic flux is set in such a manner that "A quantity of magnetic flux of the ring magnet (I) 27" <"A quantity of magnetic flux of the auxiliary pole magnet".

(2) The magnetic pole pitch of at least one magnetic pole pair of the ring magnet (I) 27 is made to be a magnetic pole pitch different from the pole tooth pitch of the stator yoke (I) 25.

(3) The pole tooth phase of a pair of stator yoke (I) 25 is shifted. Alternatively, the pole tooth shape of the stator yoke (I) 25 is made to be not symmetrical.

(4) A gap formed between the pole teeth 25h of the stator yoke (I) 25 and the ring magnet (I) 27 is made to be not uniform.

EMBODIMENT 6

A portable terminal device of the invention, for example, a cellular phone, a pocket bell or a portable terminal device, into which the function of recording and reproducing, the function of a telephone or the function of a television set is incorporated, is composed of a stepping motor for generating vibration having the aforementioned characteristics. Due to the foregoing, it is possible to compose a portable terminal device capable of providing the action and effect of the stepping motor for generating vibration described above.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present application claims foreign priority based on Japanese Patent Application No. JP2005-156425 filed on May 27 of 2005, the contents of which is incorporated herein by reference.

What is claimed is:

1. A stepping motor for generating vibration, comprising:
   a stator, comprising:
      an annular stator coil; and a pair of stator yokes each comprising pole teeth, and the annular stator coil is held between the pair of stator yokes so that the pole teeth of the one of the stator yokes meshes with the pole teeth of the other of the stator yokes in a comb-like arrangement; and a rotor, comprising:
- a shaft;
- a magnet; and
- a rotor frame, comprising:
  - a substantial cup-shape comprising a disk portion having an opening at a center thereof, and a cylindrical portion continuously arranged at a periphery of the disk portion; and
  - a weight portion arranged in a part of the rotor frame so that a gravity center of the rotor frame is located at a position eccentric with respect to a center of the rotor frames, wherein the stator is disposed in the rotor frame, and
wherein the pole teeth arranged in the comb-like arrangement include a plurality of pairs of pole teeth, with one of the pairs of the plurality of pairs of pole teeth having widths different from each other so that the rotor can always rotate in one direction at the time of starting and at least one of the other pairs of the plurality of pairs of pole teeth having a same width.

2. The stepping motor according to claim 1, wherein the magnet is a ring magnet comprising a plurality of pairs of magnetic poles annularly arranged.

3. The stepping motor according to claim 2, wherein each magnetic pole in at least one pair of the plurality of pairs of magnetic poles has a length in a rotation direction of the rotor, the length being different from a uniform length of each magnetic pole in the other pairs so that the rotor can always rotate in one direction at the time of starting.

4. The stepping motor according to claim 2, wherein the rotor frame has an auxiliary pole magnet used in a combination with the ring magnet, and the auxiliary pole magnet is arranged so that the rotor can always rotate in one direction at the time of starting.

5. The stepping motor according to claim 1, wherein the magnet is disposed inside the rotor frame.

6. The stepping motor according to claim 1, wherein the magnet is opposed to the pole teeth, and the magnet is located at an outer side of the pole teeth in a radial direction of the rotor.

7. The stepping motor according to claim 1, wherein the magnet is opposed to the pole teeth, and the magnet is disposed on the shaft and located at an inner side of the pole teeth in a radial direction of the rotor.

8. The stepping motor according to claim 1, which comprises a cover that covers the stator and the rotor, wherein the magnet comprises a ring magnet and an auxiliary pole magnet, the auxiliary pole magnet is attached to the cover so that the rotor can always rotate in one direction at the time of starting.

9. The stepping motor according to claim 1, wherein a ratio of a narrow-width pole tooth to a wide-width pole tooth of the pair of pole teeth having widths different from each other is approximately 0.6.

10. The stepping motor according to claim 9, wherein a gap between the narrow-width pole tooth and the wide-width pole tooth of the pair of pole teeth having widths different from each other is substantially similar to a gap between the narrow-width pole tooth and adjacent pole teeth.

* * * * *

UNITED STATES PATENT AND TRADEMARK OFFICE
CERTIFICATE OF CORRECTION

| | |
|---|---|
| PATENT NO. | : 7,271,516 B2 |
| APPLICATION NO. | : 11/412999 |
| DATED | : September 18, 2007 |
| INVENTOR(S) | : Masaaki Matsubara et al. |

Page 1 of 1

It is certified that error appears in the above-identified patent and that said Letters Patent is hereby corrected as shown below:

IN THE CLAIMS

Claim 1, Column 21, line 17; please change "frames" to --frame--

Signed and Sealed this

Twenty-sixth Day of August, 2008

JON W. DUDAS
*Director of the United States Patent and Trademark Office*